Sept. 25, 1962   A. UNGER ET AL   3,055,617
VISUAL OMNIDIRECTIONAL RANGE STATION MONITOR
Filed March 19, 1958   2 Sheets-Sheet 1
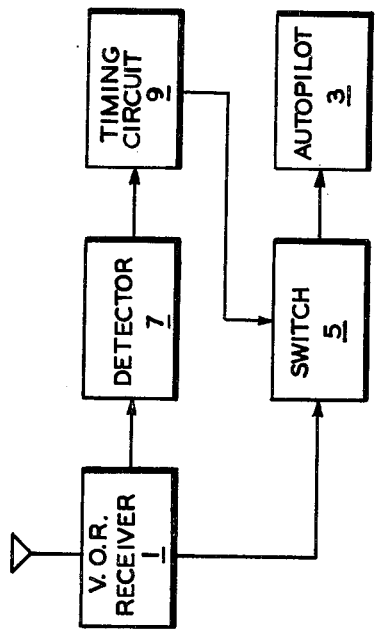
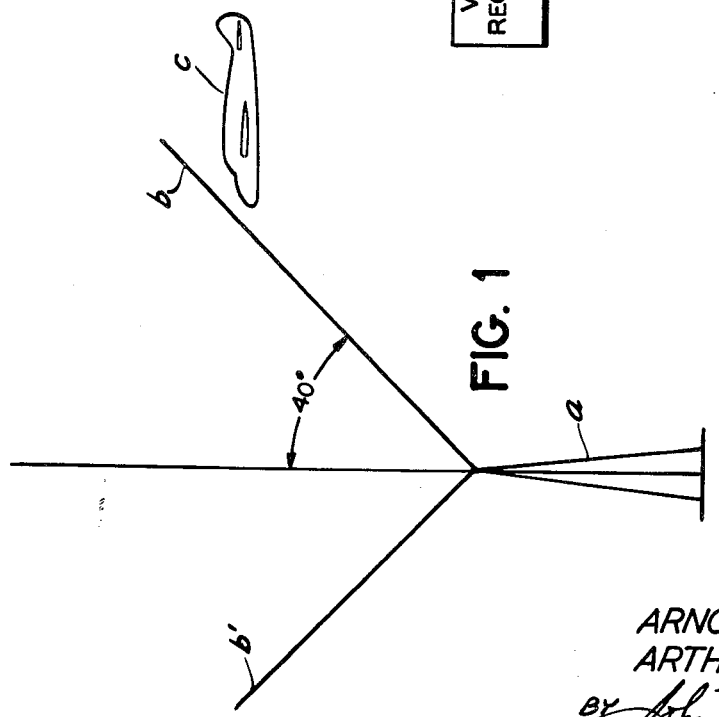
INVENTORS
*ARNOLD UNGER*
*ARTHUR C. DIANI*
BY *John B. Froam*
ATTORNEY Sept. 25, 1962  A. UNGER ET AL  3,055,617
VISUAL OMNIDIRECTIONAL RANGE STATION MONITOR
Filed March 19, 1958  2 Sheets-Sheet 2

INVENTORS
ARNOLD UNGER
ARTHUR C. DIANI
By John B. Frisone
ATTORNEY

United States Patent Office 3,055,617
Patented Sept. 25, 1962

3,055,617
VISUAL OMNIDIRECTIONAL RANGE STATION MONITOR
Arnold Unger, Hasbrouck Heights, and Arthur C. Diani, Clifton, N.J., assignors to The Bendix Corporation, a corporation of Delaware
Filed Mar. 19, 1958, Ser. No. 722,564
6 Claims. (Cl. 244—77)

This invention relates to monitors and more particularly to monitors for detecting the cone of ambiguity over a visual omnidirectional range (VOR) station.

Aircraft while flying on a VOR beam under the control of an autopilot or human pilot using a flight director encounter severe difficulty when approaching a VOR station while in the cone of ambiguity because the radio signals controlling heading of the aircraft are erratic. Attempts have been made to use beam rate or the warning flag signal for sensing VOR station proximity but with limited success.

One object of this invention is to provide a VOR station monitor which accurately detects when a craft enters the cone of ambiguity over a VOR station.

Another object of this invention is to provide a VOR station monitor which provides smooth aircraft heading control on a VOR beam over a VOR station while flying under the control of an autopilot or human pilot using a flight director.

Another object of the invention is to provide a VOR station monitor which accurately detects the entrance of an aircraft into the cone of ambiguity over a VOR station and renders beam error information ineffective from controlling the craft for a predetermined time.

Another object of the invention is to provide a VOR station monitor which enables the craft to fly the VOR beam closer to the station than heretofore by more accurately detecting the boundaries of the cone of ambiguity.

Another object of this invention is to provide a VOR station monitor which accurately detects the entrance of an aircraft into the cone of ambiguity over a VOR station and for a predetermined time programs the automatic control system to an existing preset course command and compensates for cross winds by maintaining the control system integrator output.

Another object of the invention is to provide a VOR station monitor which detects predetermined changes in the to-from flag signal from a VOR station and renders the VOR beam error signal therefrom ineffective to control an aircraft for a predetermined time.

The invention contemplates a VOR station monitor for aircraft which renders the beam error signal ineffective on the autopilot or flight director in the craft upon a predetermined change in the to-from flag signal of the radio receiver so that the craft lies from preset heading information for a predetermined time to provide smooth aircraft control through the VOR cone of ambiguity.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

FIGURE 1 is a diagrammatic representation of a VOR station and its associated cone of ambiguity;

FIGURE 2 is a block diagram of a novel monitoring system, constructed according to the invention, which receives signals from a radio receiver and controls operation of an autopilot.

Figure 3:
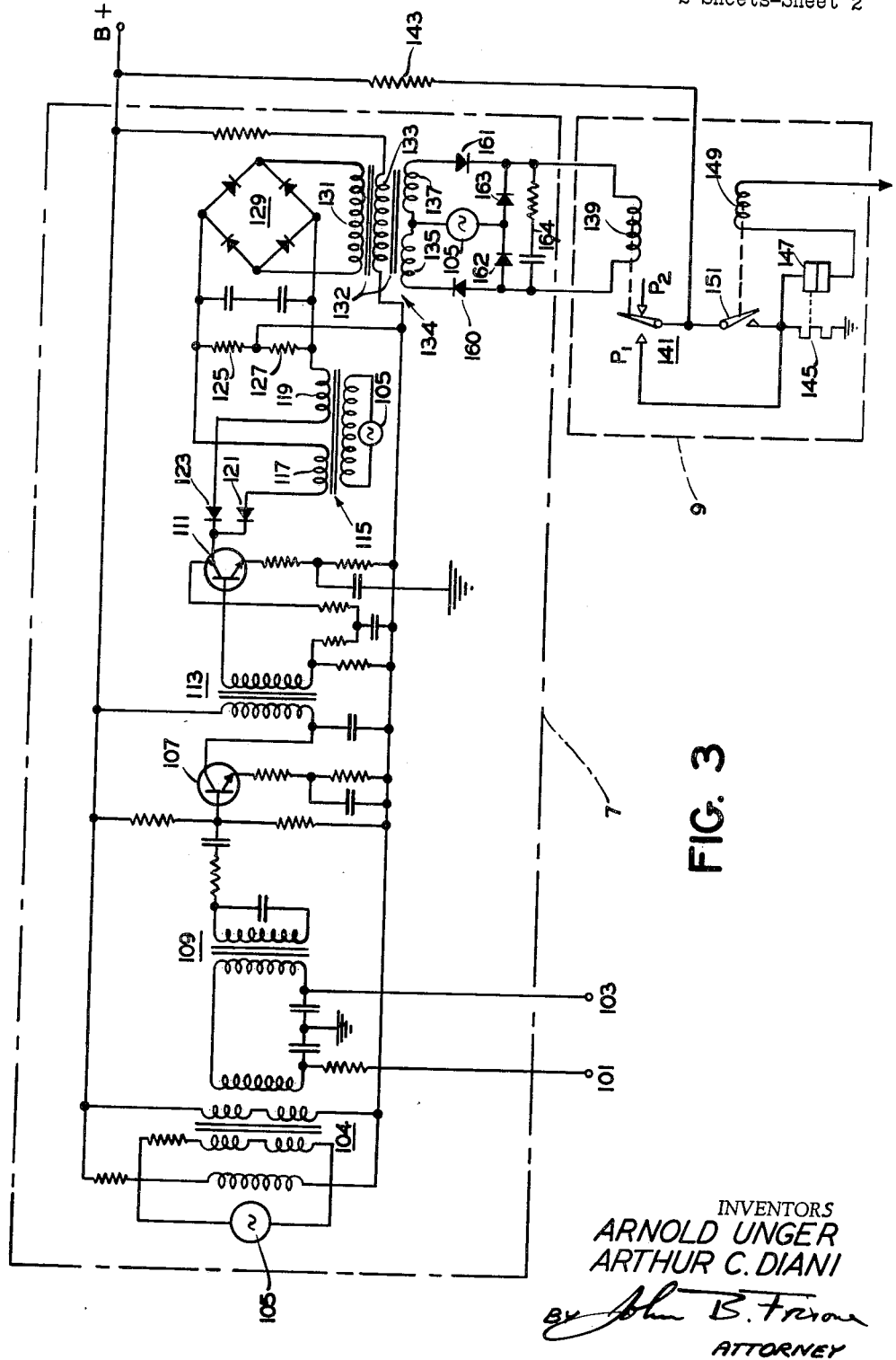
FIGURE 3 is a schematic diagram of the detector and timing circuit shown in block form in FIGURE 2.

In FIGURE 1, the cone of ambiguity above a VOR station A is shown by lines B—B' intersecting at an angle of approximately 80 degrees. An aircraft C is illustrated approaching the cone of ambiguity.

The aircraft may be provided with a VOR receiver 1 shown in FIGURE 2 for providing a beam error signal to an autopilot 3 or a flight director (not shown). Autopilot 3 responds to the beam error signal to maintain the aircraft on the preselected beam.

The novel monitoring circuit includes a detector 7 which receives to-from flag signals from receiver 1 and senses changes in the signal. Upon sensing a predetermined change, detector 7 activates a timing circuit 9 which opens switch 5 for a predetermined time and disconnects the beam error signal from autopilot 3. The circuits for deriving the to-from signal are shown on pages 4–25, 4–26 and 4–27 of the Instruction Book for Type MN-85 VHF Navigational System published by Bendix Radio Division of The Bendix Corporation, Baltimore, Maryland.

The autopilot during this time is programmed to the existing preset course command, and control of the aircraft is primarily accomplished by use of the heading loop. Compensation for existing cross winds is secured by maintaining the autopilot integrator output. The time delay of timing circuit 9 is preset to insure ample time at estimated cruising speeds and altitude for the aircraft to traverse the cone of ambiguity before closing switch 5 to resume the normal tracking configuration. The time delay period of timing circuit 9 may be made responsive to one or more flight parameters to automatically set the length of the time delay.

In FIGURE 3, the to-from flag signal from the radio receiver is applied to detector 7 via a pair of terminals 101 and 103 connected to a modulator 104 energized by a source of alternating current 105. The modulated signal from modulator 104 is applied through a transformer 109 to a transistor amplifier having stages 107 and 111 coupled by a transformer 113.

Alternating current source 105 is connected to a primary winding 114 of a transformer 115. A pair of secondary windings 117 and 119 are wound on the core of transformer 115 in opposite directions. One end of each secondary winding is connected via one of a pair of rectifiers 121 and 123 to the collector of transistor 111 and together provide a fullwave rectified direct current collector voltage. The other ends of windings 117 and 119 are connected across a pair of series connected resistors 125 and 127 which have a grounded common connection. Depending on the magnitude of the to-from flag signal, a voltage will appear across series connected resistors 125 and 127. A one-way rectifying bridge 129 is connected across resistors 125, 127 and provides a unidirectional voltage of fixed polarity to a primary winding 131 wound on a core 132 of a saturable reactor 134. A bias winding 133 on core 132 is connected to B+ to saturate the core. A pair of control windings 135 and 137 are wound on core 132 and are energized by alternating current source 105 and provide alterante paths via a one-way rectifying system including diodes 160, 161, 162, 163 and a resistance capacitance filter 164 to a relay coil 139. When core 132 is saturated the impedances of windings 135 and 137 are negligible and a voltage is impressed across relay coil 139 to actuate a relay switch 141 which is shown in FIGURE 3 in its unactuated condition.

As long as the to-from flag signal voltage remains at its steady state a direct current voltage is impressed across winding 131 which induces flux in core 132 to oppose the flux induced therein by bias winding 133 to maintain the core unsaturated. When the core is unsaturated the impedance of control windings 135, 137 is high and the voltage across coil 139 is insufficient to actuate switch 141. When the to-from flag signal decreases in magnitude by a predetermined amount, the direct current voltage impressed across winding 131 diminishes and bias winding 133 drives the core to saturation, thus reducing the impedance of control windings 135 and 137 which in turn impresses a voltage across coil 139 of sufficient magnitude to actuate switch 141 to position $P_1$ to establish a direct current path from B+ through a dropping resistor 143 to a time delay switch 145 and to relay solenoid 149 which when energized closes switch 151 to provide and alternate path from B+ to time delay circuit 145 and switch 5 of FIGURE 2. After a predetermined time, time delay switch contacts 147 open to deenergize relay solenoid 149 to open switch 151 and switch 5 to disconnect the beam error signal from the autopilot.

The time delay is sufficient so that the craft will have traversed the cone of ambiguity and be receiving a steady state to-from flag signal so that coil 139 will not be energized sufficiently to actuate switch 141. Time delay circuit 145 is deenergized upon opening of switches 141 and 151 and contacts 147 return to their normally closed position.

The system disclosed provides a reliable means for detecting the entrance of an aircraft into the cone of ambiguity over a VOR station and removes the erratic beam error information from the autopilot so that the craft flies on preset heading signals until the cone has been traversed and the VOR signals can again be relied upon.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A monitor for an aircraft having a radio receiver for controlling operation of an automatic pilot from a radio beam, comprising a detector adapted to receive to-from flag signals from the radio receiver and sense a predetermined change in the signals as the craft enters the cone of ambiguity over the radio station, and means connecting the radio receiver to the automatic pilot and actuated by the detector upon sensing a predetermined change in the signals for rendering the radio receiver ineffective to control the automatic pilot as the craft flies through the cone of ambiguity.

2. A monitor for an aircraft having a radio receiver for controlling operation of an automatic pilot from a radio beam, comprising a detector adapted to receive to-from flag signals from the radio receiver and sense a predetermined change in the signals as the craft enters the cone of ambiguity over the radio station, a timing circuit connected to the detector, and means connecting the radio receiver to the automatic pilot and actuated by the timing circuit when the detector senses a predetermined change in the signals for rendering the radio receiver ineffective to control the automatic pilot as the craft flies through the cone of ambiguity, and the timing circuit again actuating the connecting means after a predetermined time for rendering the radio receiver effective to control the automatic pilot after the craft leaves the cone of ambiguity.

3. A VOR station monitor including detecting means adapted to receive to-from flag signals from a VOR receiver and sense predetermined changes in the signals, and a circuit connected to the detecting means and actuated when the detector first senses a predetermined amplitude change in the to-from flag signal to disconnect the VOR receiver.

4. A VOR station monitor including means for receiving a VOR to-from flag signal and a beam error signal, means responsive to the to-from flag signal for detecting predetermined changes in the to-from flag signal, timing means actuated by the detecting means when the detecting means first senses a predetermined change in the to-from flag signal, and switching means connected to the receiving means for providing beam information to an automatic control system and actuated by said timing means for rendering the beam error signal ineffective on the control system for a predetermined time when the detecting means first senses a change in the to-from flag signal.

5. A VOR station monitor comprising a VOR receiver for providing a to-from flag signal, an automatic control system responsive to beam error signals from the receiver for controlling an aircraft in response to the sigals, switching means connecting the receiver and the control system, detecting means connected to the receiver for detecting changes in the to-from flag signal from the receiver, and timing means connecting the monitor and the switching means for rendering the beam error signal ineffective on the control system for a predetermined time when the monitor detects a predetermined change in the to-from flag signal.

6. A VOR station monitor including detecting means adapted to receive to-from flag signals from a VOR receiver and sense predetermined changes in the signals, a timing circuit connected to the detector and actuated when the detector first senses a predetermined change in the signals, and switch means for connecting the beam error signal from the receiver to an automatic control system and actuated by said timing cricuit for rendering the beam error signal ineffective on the control system for a predetermined time when the timing circuit is actuated.

References Cited in the file of this patent

UNITED STATES PATENTS

| | | |
|---|---|---|
| 2,393,624 | Ferrill | Jan. 29, 1946 |
| 2,612,331 | Frazier et al. | Sept. 30, 1952 |
| 2,704,647 | Meyers et al. | Mar. 22, 1955 |
| 2,732,550 | Reedy | Jan. 24, 1956 |
| 2,881,992 | Hecht et al. | Apr. 14, 1959 |